United States Patent
Nakamura et al.

[11] Patent Number: 6,023,032
[45] Date of Patent: Feb. 8, 2000

[54] SHIFT KNOB STRUCTURE WITH SUPPORT GROOVES AND HOLE FOR RECEIVING TIGHTLY CONDUCTOR WIRE

[75] Inventors: Shinya Nakamura; Tsuyoshi Sotome; Keizo Kimura, all of Tokyo, Japan

[73] Assignee: Niles Parts Co., Ltd., Japan

[21] Appl. No.: 08/920,896

[22] Filed: Aug. 29, 1997

[30] Foreign Application Priority Data

Aug. 29, 1996 [JP] Japan .................................... 8-245455

[51] Int. Cl.$^7$ .................................................. H01H 9/06
[52] U.S. Cl. ......................................................... 200/61.88
[58] Field of Search ........................... 200/61.88, 61.87; 74/473.12, 473.19; 439/34

[56] References Cited

U.S. PATENT DOCUMENTS

| | | | |
|---|---|---|---|
| 5,247,849 | 9/1993 | Sato | 200/61.88 X |
| 5,345,836 | 9/1994 | Yokoyama et al. | 200/61.88 X |
| 5,706,701 | 1/1998 | Murakami | 200/61.88 X |
| 5,727,423 | 3/1998 | Torii et al. | 200/61.88 X |

FOREIGN PATENT DOCUMENTS 60-174922  11/1985  Japan .

*Primary Examiner*—Renee S. Luebke
*Attorney, Agent, or Firm*—Rader, Fishman & Grauer; Ronald P. Kananen

[57] ABSTRACT

A shift knob structure having a knob main body 1 formed by a skeleton 2 and a skin member 3 encapsulating over the skeleton 2. A switch 6 is provided on the knob main body 1. A conductor wire 7 is buried in the skeleton 2 and connected at one end to the terminal 6a of the switch 6. The skeleton 2 has a switch mounting portion 2f for mounting the switch 6 and a first support groove 2j formed in a bottom surface of the switch mounting portion 2f to insert therein the conductor wire 7. The skeleton 2 has a second support groove 2n formed in a lateral side thereof to insert therein the conductor wire 7. A press-fit hole 2k is formed open between the second support groove 2n and the first support groove 2j to pass the conductor wire 7 therethrough. As a result of this shift knob construction, the number of bend portions in a conductor wire is decreased, thereby reducing the number of fabricating processes and cost.

8 Claims, 4 Drawing Sheets

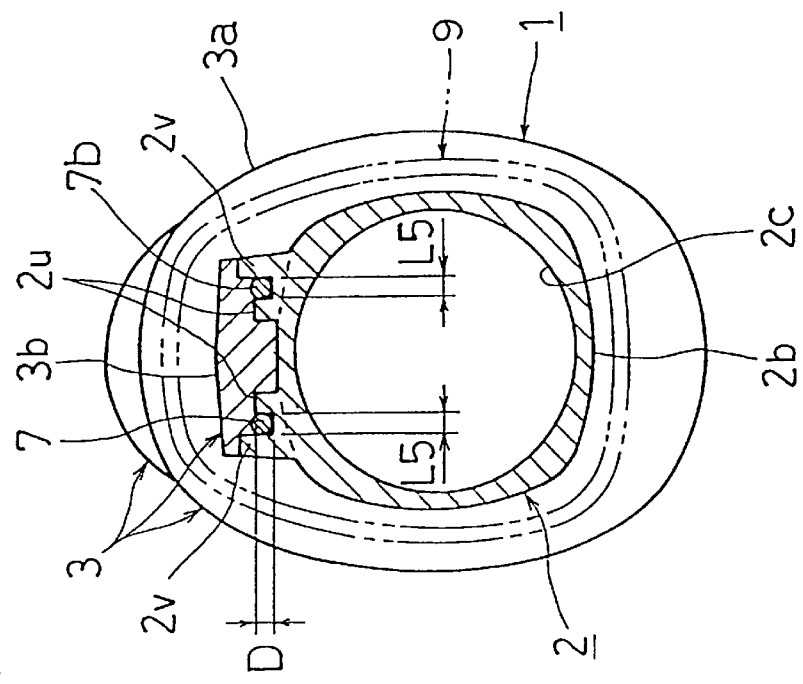
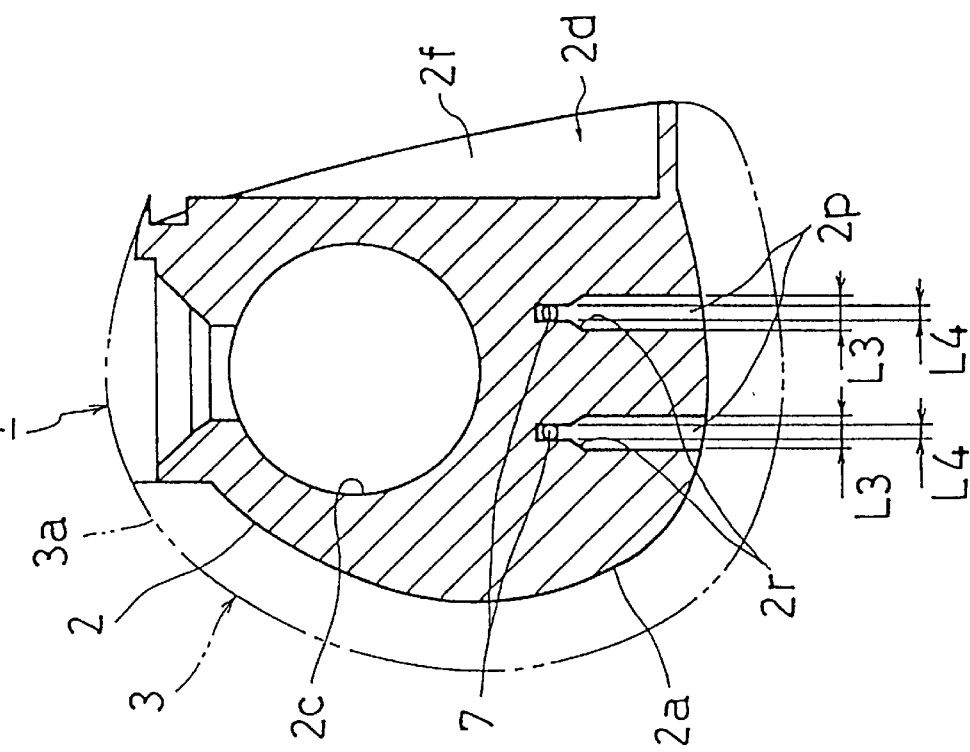

6,023,032

SHIFT KNOB STRUCTURE WITH SUPPORT GROOVES AND HOLE FOR RECEIVING TIGHTLY CONDUCTOR WIRE

BACKGROUND OF THE INVENTION

1. Field of the Invention

This invention relates generally to shift knob structures for automotive vehicles and, in particular, to a structure of a shift knob with a switch having conductor wires for connection to the switch that are laid in the shift knob of a shift lever mounted on an automotive vehicle.

2. Description of the Related Art

A conventional shift knob structure is disclosed, for example, in Japanese provisional Utility Model Publication (Kokai) No. S60-174922. The conventional shift knob structure has a switch arranged on a shift knob, wherein a wire is insert-formed in the shift knob to be connected to a power source provided on a body side of the vehicle.

However, the wire in the shift knob is bent at several points for convenience due to the shape of the shift knob, the position of a shaft insertion hole opened at a center of the shift knob, and so on. This causes problems of increasing the number of manufacturing processes and raising cost.

SUMMARY OF THE INVENTION

It is an object of the present invention to provide a structure of a shift knob with a switch that solves the problems associated with the conventional shift knob structure described above.

More specifically, it is an object of the present invention to provide a shift knob structure that reduces the number of bending points in conductor wires to thereby reduce the number of manufacturing processes and cost.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a shift knob structure with a switch is provided that reduces the number of bending points in conductor wires within the shift knob. The shift knob has a knob main body formed by a skeleton, and a skin member encapsulating over the skeleton, a switch provided on the knob main body, and a conductor wire received in the skeleton and connected at one end to a terminal of the switch. The shift knob structure comprises a switch mounting portion formed in the skeleton for mounting the switch, and a first support groove formed in a bottom surface of the switch mounting portion to insert therein the conductor wire; a second support groove formed in a lateral side of the skeleton to insert therein the conductor wire; and a press-fit hole being formed open between the second support groove and the first support groove to pass the conductor wire therethrough.

The press-fit hole preferably has a relation of L1<D<L2, wherein L1 is a diameter of an end of the press-fit hole on the side of the first support groove, L2 is a diameter of an end of the press-fit hole on the side of the second support groove, and D is a diameter of the conductor wire.

A grip portion of the skeleton preferably has a second support groove formed generally perpendicular to the first support groove, and a third support groove provided generally rectangular to the second support groove in a manner continuous therewith, wherein a slant surface is formed in the third support groove.

The third support groove preferably has a relation of L3>D>L4, wherein L3 is a width of an opening of the third support groove, L4 is a width of a bottom surface of the third support groove, and D is the diameter of the conductor wire.

The conductor wire is bent generally rectangular at respective ends of a portion press-fitted in the second support groove. A conductive metal wire elastically deformed to be received in the skeleton is provided at a portion press-fitted in the third support groove.

BRIEF DESCRIPTION OF THE DRAWINGS

The present invention will become more clearly appreciated as the disclosure of the invention is made with reference to the accompanying drawings. In the drawings:

FIG. 3 is an enlarged sectional view according to the preferred embodiment of the present invention;

FIG. 4 is an enlarged lateral sectional view of a hollow rod member when encapsulated by a skin member over the skeleton, according to the preferred embodiment of the present invention;

DETAILED DESCRIPTION OF THE INVENTION

Figure 1:
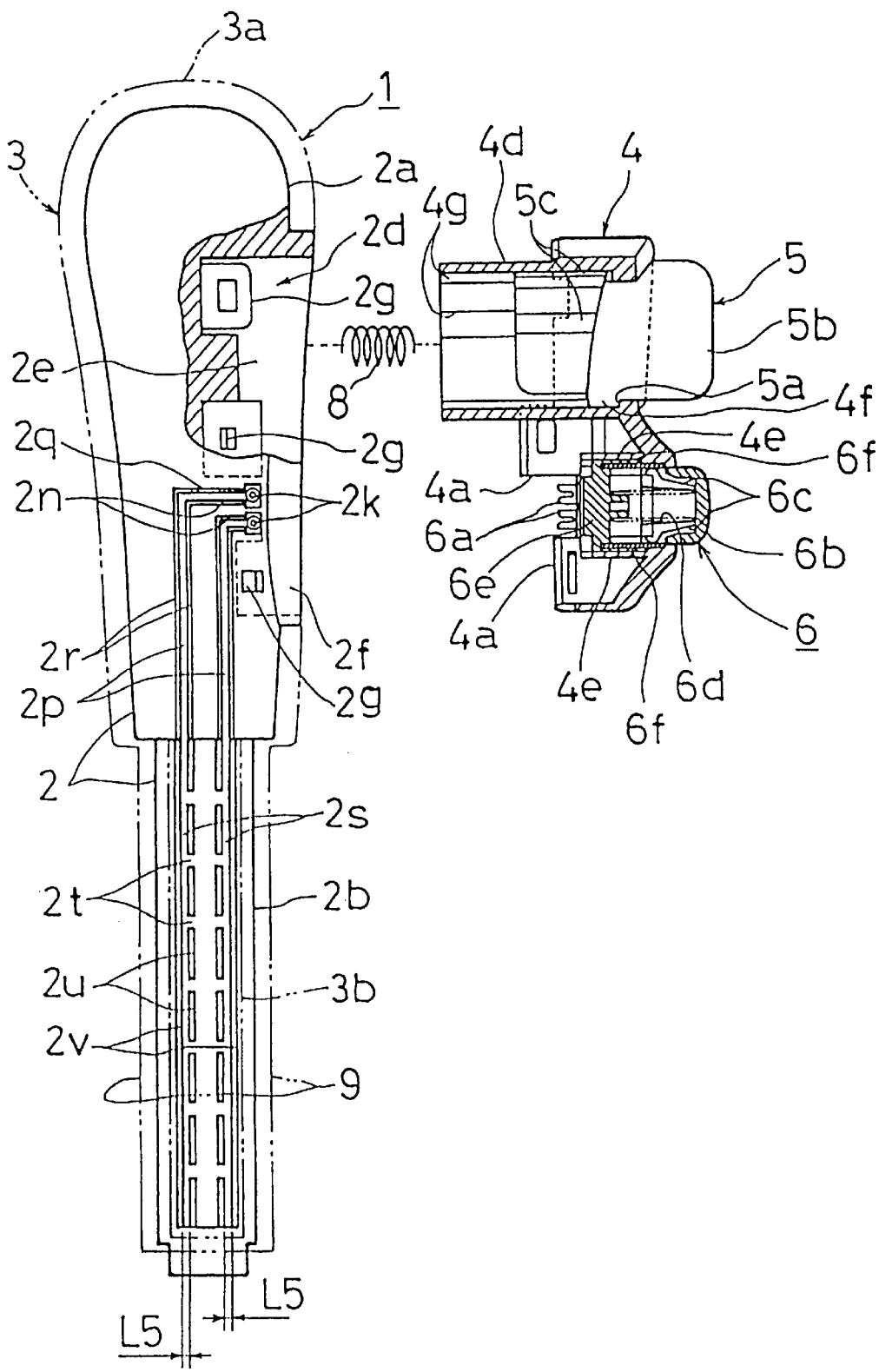
FIG. 1 is an exploded side view in partial section of an essential part of a preferred embodiment of the present invention.

A preferred embodiment of a shift knob structure according to the present invention will now be described in detail with reference to FIGS. 1 to 6 of the drawings.

A knob main body 1 of a shift lever is formed in one body by a skeleton 2 on an inner side and a skin member 3 on an outer side. The knob main body 1 is provided with a push-button mounting member 4, a push button 5, a switch 6, a detent rod (not shown), and a coupling member (not shown).

The skeleton 2 is formed of a hard resin to have a grip portion 2a and a hollow rod portion 2b for inserting the detent rod therein. The skeleton 2 has an axial hole 2c opened in which the detent rod is inserted, and a mounting hole 2d in which a push-button mounting member 4 is fitted.

Figure 2:
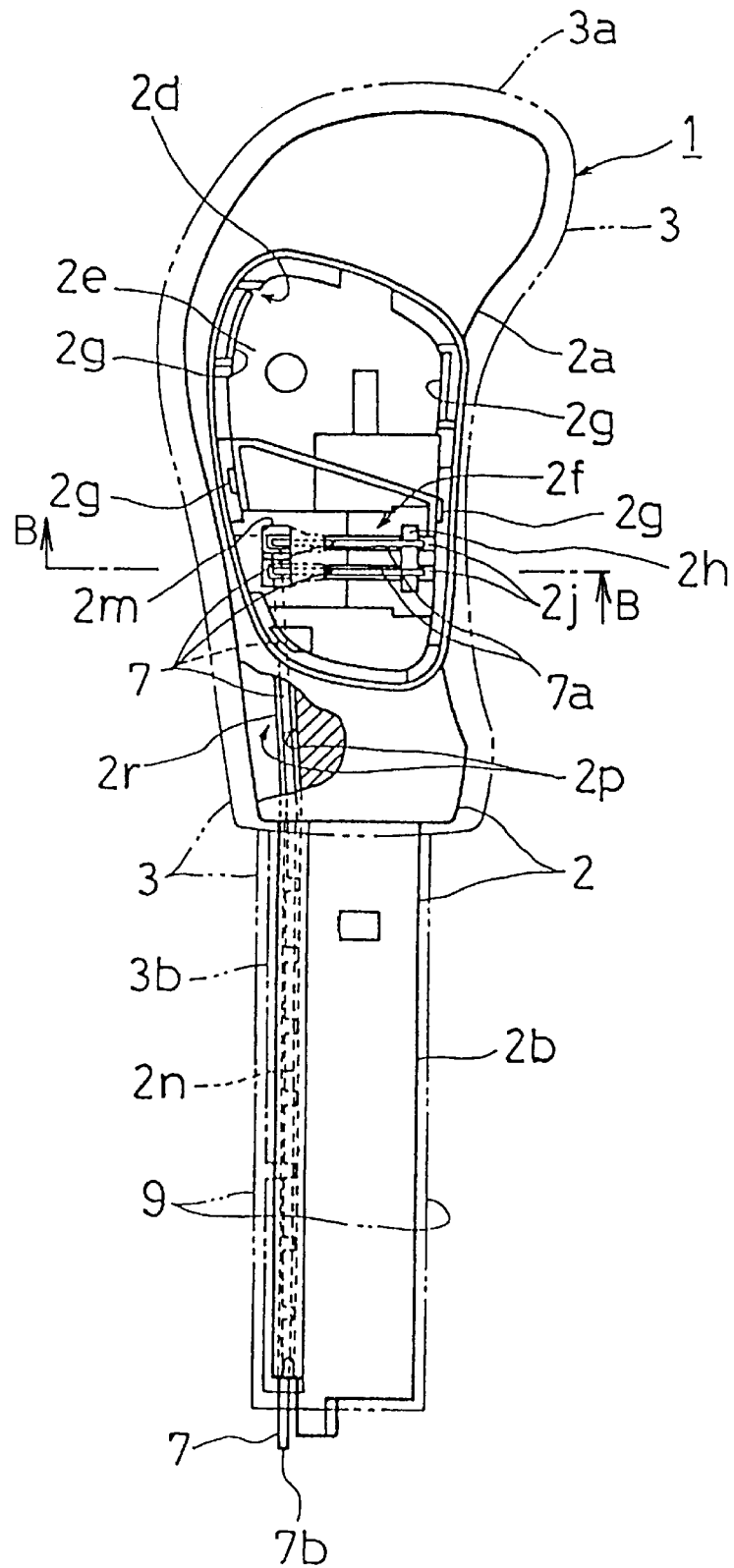
FIG. 2 is a front view in partial section of a skeleton assembled with conductor wires, according to the preferred embodiment of the present invention.
Figure 6:
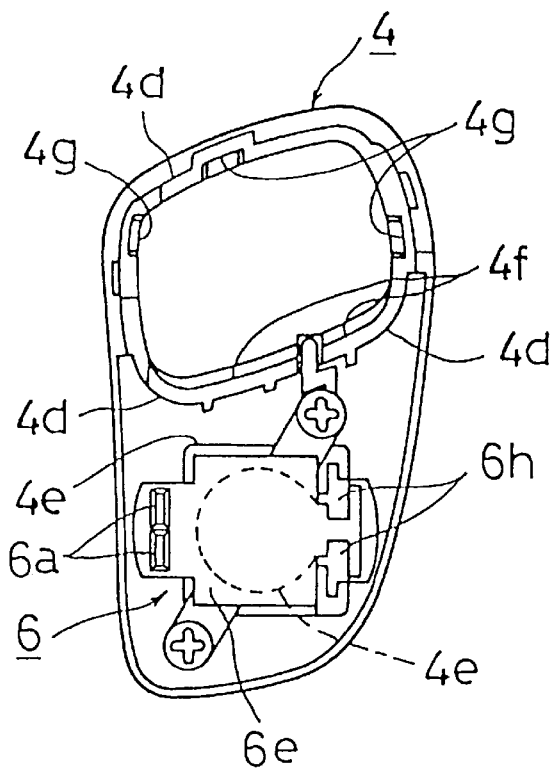
FIG. 6 is an enlarged rear view of a push button mounting member assembled with a switch, according to the preferred embodiment of the present invention.

The axial hole 2c is continuous with the push-button mounting portion 2e of the mounting hole 2d, as shown in FIG. 1. The mounting hole 2d has the push-button mounting portion 2e in which the push button 5 is arranged, and a switch mounting portion 2f in which a switch 6 is arranged, as shown in FIGS. 1 and 2. The mounting hole 2d has a plurality of engaging portions 2g formed in an inner wall thereof with which the engaging portion 4a of the push-button mounting member 4 is engaged, as shown in FIGS. 1 and 6.

Figure 5:
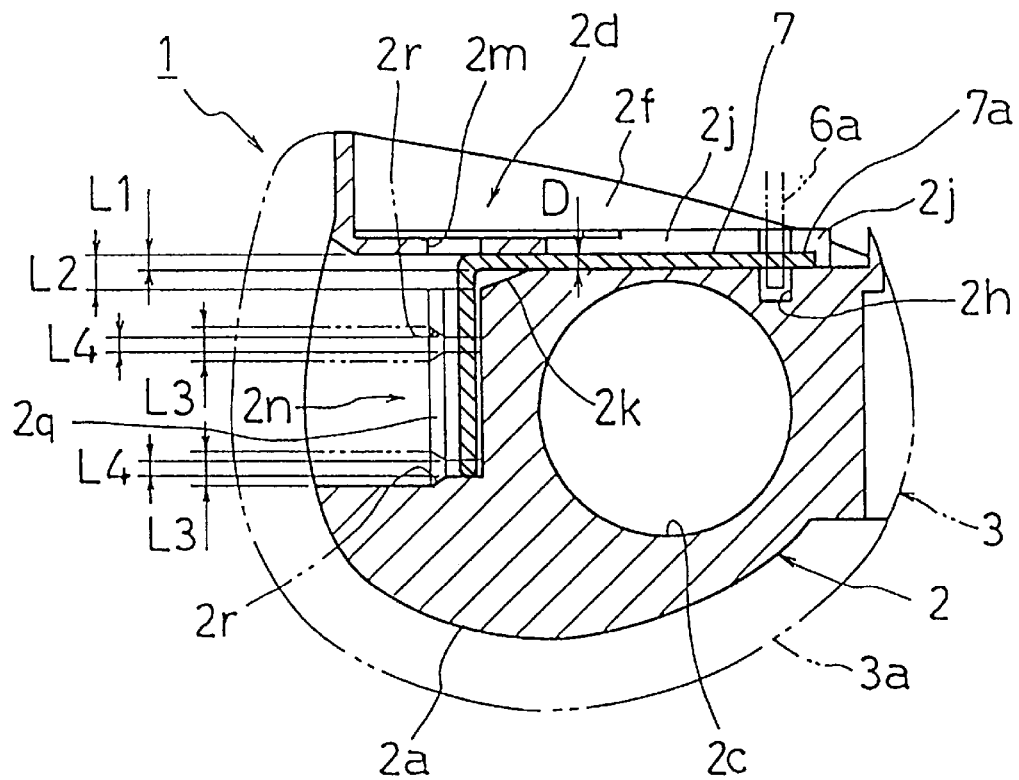
FIG. 5 is an enlarged sectional view taken on arrows B—B in FIG. 2.

The push-button mounting portion 2e is a lateral hole that is in communication with the axial hole 2c. The switch mounting portion 2f is formed with first support grooves 2j to which are fitted conductor wires 7 that are to be connected to terminals 6a of the switch 6, as shown in FIGS. 1 and 5. The engaging portion 2g is engaged with the engaged portion 4a formed by a resilient tongue having, for example, a claw or a hole, as shown in FIGS. 1 and 2. The first support groove 2j serves to expose the conductor wire 7 to the switch mounting portion 2f, as shown in FIGS. 2 and 5, and is a groove for supporting the conductor wire 7 by inserting the end thereof. The first support groove 2j has at one end a terminal insertion hole 2h, and at the other end a hole 2k for tightly retaining conducting wire 7 having an inner diameter the same as the outer diameter of the conductor wire 7.

The terminal insertion hole 2h is a blind hole in which, when the push-button mounting member 4 assembled with the switch 6 is inserted in the push-button mounting portion 2e, terminals 6a respectively engaged with the two conductor wires 7 are fitted with some play. The hole 2k, as shown in FIG. 5, are each in a tapered form having an opening portion wider than the diameter of the conductor wire 7 on a side of the second support groove 2n from which side the conductor wire 7 is inserted, and an opening portion having the same diameter as the diameter of the conductor wire 7 or a diameter somewhat shorter than the diameter of the conductor wire 7.

The opening portion on the conductor wire 7 insertion side of the hole 2k is, for example, in a conical form, a polygonal tapered fit, or a generally tapered form having a slant surface formed in a part or the entire periphery of an opening end. The hole 2k prevents, by inserting the conductor wire 7 therein, the conductor wire 7 from moving toward the side of the switch mounting portion 2f. That is, the press-fit hole 2k has the relationship of $L1 \leq D < L2$, as shown in FIG. 5, wherein D is the diameter of the conductor wire 7, L1 is the diameter of the opening portion of the hole 2k on the side of the terminal insertion hole 2b, and L2 is the diameter of the opening end of the hole 2k on the side of the pin insertion hole 2m.

As shown in FIGS. 2 and 5, a pin insertion hole 2m is formed by inserting a pin when the second support grooves 2n are die-formed by a resin. The second support grooves 2n are arranged at right angles with a pair of third support grooves 2p spaced at an equal interval in a lateral direction. The second support grooves 2n thus provide a longitudinally parallel arrangement for holding the conductor wires 7 by press-fitting, as shown in FIG. 1. The second support grooves 2n are formed in a different direction perpendicular to the first support grooves 2j. The second support groove 2n and the third support groove 2p have a width at an opening portion wider than the diameter of the conductor wire 7, and a width at a bottom surface of the same width as the diameter of the conductor wire 7 or somewhat shorter than the diameter of the conductor wire 7, as shown in FIGS. 3 and 5. The second support groove 2n and the third support groove 2p, respectively, have slant surfaces 2q, 2r formed at their insides.

That is, the second support groove 2n and the third support groove 2p each have a relationship of $L3 > D > L4$, wherein L3 is the width of the opening portion, L4 is the width of the bottom surface, and D is the diameter of the conductor wire.

The third support grooves 2p are formed to extend almost vertically downward with respect to the second support grooves 2n, as shown in FIG. 1. The third support groove 2p at its bottom surface is positioned, as shown in FIG. 2, for convenience for providing the push-button mounting member 4 and the axial hole 2c in the skeleton 2. A fourth support groove 2s is provided below the third support groove 2p in the hollow rod portion in a manner continuous therewith to extend vertically downward. The slant surfaces 2q, 2r are for facilitating press-fitting of the conductor wires 7 into the bottom surface portions of the second support groove 2n and the third support groove 2p which bottom surface portions are the same size as or somewhat shorter than the diameter D of the conductor wire 7.

The fourth support grooves 2s are formed, as shown in FIG. 1, by inner walls 2u that project slightly from the hollow rod portion 2b to have cut-out portions 2t, and an outer wall 2v higher than the inner walls 2u. The fourth support groove 2s is made to hold, by press-fitting, the conductor wire 7 by providing the spacing between part or the entirety of the inner walls 2u and the outer wall 2v the same as or somewhat shorter than the diameter D of the conductor wire 7. The spacing L5 between the inner walls 2u and the outer wall 2v at part or the entirety thereof are in an unequal relationship of $L5 \leq D$.

The skin member 3 is formed, for example, of a vinyl chloride resin or a foaming resin, which is provided in a state of encapsulating around the grip portion 2a of the skeleton 2 and the hollow rod member 2b after laying the conductor wire 7 on the skeleton. The skin member 3 comprises a grip encapsulating portion 3a that encapsulates the entire grip portion 2a, and a conductor wire encapsulating portion 3b that encapsulates the hollow rod member 2b.

The skin member 3 at the grip encapsulating portion 3a is for making the feeling comfortable when a driver grasps the knob main body 1. Further, the encapsulating may be by a leather material. The grip encapsulating portion 3a wraps around the grip portion 2a, and buries and insulates the conductor wires 7 by burying such cavities as the second support grooves 2n, the third support grooves 2p, and the like. The conductor wire encapsulating portion 3b is formed by die-forming integral and simultaneous with the grip encapsulating portion 3a. The conductor wire encapsulating portion 3b serves both as a fixing member for fixing the conductor wire 7 on the hollow rod portion 2b and an insulating material for the conductor wire 7.

The push-button mounting member 4 for receiving the switch 6 and the push button 5 is fixed on the skeleton 2 by engaging the engaging portion 4a with the engaging portion 2g, as shown in FIG. 1. The push-button mounting member 4 is fitted in the mounting hole 2d, and integrally formed with a first elongated portion 4d for providing the push button 5 and a second cylindrical portion 4e for mounting the switch 6.

The first cylindrical portion 4d has therein the push button 5 inserted from the back side thereof so that the operating portion 5b is arranged to project out of the first cylindrical portion 4d, as shown in FIGS. 1 and 6. The first cylindrical portion 4d is formed with a fall-out preventing portion 4f, in the vicinity of an opening end on the front side thereof, against which a stopper 5a of the push button 5 abuts. Also, the first cylindrical portion 4d is formed with a guide wall 4g in an inner wall for engagement with a guide concave portion 5c so that, when the push button 5 is press-operated as shown in FIG. 1, the push button 5 is retracted straightly.

The second cylindrical portion 4e of the push button 4 has a role as a case body for the switch 6, as shown in FIG. 6. The second cylindrical portion 4e has a switch knob 6b and a coil spring 6d that extends through a movable contact piece 6c inserted from the back side of the second cylinder portion 4e. The second cylindrical section 4e is closed by a member 6e having a fixed contact 6f of a switch. The second cylindrical portion 4e at the front side is in a circular form conforming to the shape of the switch knob 6b, as shown in FIG. 6, and at the back side is in a elongated form having a rectangular section. A support plate (not shown) is arranged around the second cylindrical portion 4e for supporting a lock pin (not shown) urged by a leaf spring (not shown).

The fall-out preventing portion 4f is in a step form formed in the vicinity of an opening end on the front side of the first cylindrical portion 4d, as shown in FIGS. 1 and 6. A stopper 5a of the push button 5 is urged by a spring 8 into pressure contact with the fallout preventing portion 4f. A plurality of guide grooves 4g formed in the inner wall of the first cylindrical portion 4d engage with a plurality of guide convex portions 5c formed in the outer wall of the push button 5.

The push button 5 is an operating member that causes the detent rod inserted in the hollow rod portion 2b to move for tilt movement of the knob main body 1. The switch 6 is an overdrive operating switch formed, for example, by a push-lock switch, a hazard switch, or the like. The switch 6 is assembled on the push-button mounting member 4 by screwing the member 6e to a peripheral portion of the second cylindrical portion 4e through the switch knob 6b, the movable contact piece 6c, and the coil spring 6d. The terminal 6a has a generally U-shaped cut-out in its tip so that the conductor wire 7 can be fitted thereon.

The conductor wire 7 is, for example, formed by a thick copper wire, and pressure-fitted in the second support groove 2n to have respective ends rectangularly bent. The conductor wire 7 is pressure-fitted in the first support groove 2j, the second support groove 2n, the third support groove 2p, and the fourth support groove 2s so that one end portion 7a is exposed in the switch mounting portion 2f, and the other end portion 7b is projected from a lower end of the hollow rod portion 2b. The one end portion 7a is a point with which the terminal 6a of the switch 6 is engaged. The other end portion 7b serves as a role of a male terminal. A cylindrical encapsulate 9 made of resin is inserted over the hollow rod portion 2b.

The preferred embodiment of the present invention is structured as above. The procedure of assembling and operating the preferred embodiment will now be described in detail.

First, the skeleton 2 is die-formed of a hard resin. The conductor wire 7 is cut to a predetermined dimension and bent at right angles at its respective two ends for inserting into the second support groove 2n.

The conductor wire 7 at one end portion 7a is inserted through the hole 2k, as shown in FIG. 5. At this time, the one end portion 7a of the conductor wire 7 is easily inserted because the hole 2k is opened in a tapered form on the side of the second support groove 2n. Further, the conductor wire 7 is urged at its almost central portion by using a tool or the like to be press-fitted in the third support groove 2p, and the one end portion 7a is inserted beyond the terminal insertion hole 2h to the vicinity of a lateral wall of the switch mounting portion 2f. The hole 2k has an aperture L1 on the side of the terminal insertion hole 2h that is shorter than the diameter D of the conductor wire 7 so that the conductor wire 7 can be held without chattering. The conductor wire 7 is prevented at the one end portion 7a, by being inserted in the hole 2k, from moving from the first support groove 2j toward the outside of the switch mounting portion 2f.

Also, the third support groove 2p has its bottom surface slanted, as shown in FIGS. 2 and 3. The central portion of the conductor wire 7 to be press-fitted in the third support groove 2p is vertically formed. The second support groove 2n and the third support groove 2p have respective slant surfaces 2q, 2r formed therein, and fitting of hole 2k is done by making the width L4 of the bottom surface slightly shorter than the diameter D of the conductor wire 7. Consequently, the conductor wire 7 can be press-fitted by a tool or the like to be held by elastic deformation in a state shown in FIG. 2.

The other end portion 7b of the conductor wire 7 is received between the inner wall 2u and the outer wall 2v. The spacing L5 between the inner wall 2u and the outer wall 2v is shorter than the diameter D of the conductor wire 7 so that the conductor wire 7 can be held by being press-fitted.

The grip portion 2a of the skeleton 2 and the spacing between the two outer walls 2v of the hollow rod portion 2b are encapsulated by die-forming using a resin, for being insulated. The conductor wire 7 press-fitted in the second support groove 2n, the third support groove 2p, and the fourth support groove 2s is buried in the resin, so that one end portion 7a is exposed to the inside of the switch mounting portion 2f and the other end portion 7b is projected from the lower end of the hollow rod member portion 2b. The hollow rod portion 2b is covered by a cylindrical encapsulate 9.

Before the push button mounting member 4 is assembled on the knob main body 1, each member of the switch 6 is inserted from the back side of the push button mounting member 4, and the push button 5 is inserted from the back side of the first cylindrical portion 4d of the push button mounting member 4. Then mounting member is assembled on main body 1. The spring 8 is inserted in a support hole of the push button 5, and the switch 6 and the push button mounting member 4 assembled with the push button 5 are fitted in the mounting hole 2d.

The push button mounting member 4 is fixed with each engaging portion 4a engaged with each engaging portion 2g. The terminal 6a of the switch 6 is press-fitted at a tip to the conductor wire 7 through the terminal insertion hole 2h so that connection is automatically done in a one-touch manner, making unnecessary such operations as soldering. The one end portion 7a of the conductor wire 7 is held by the press-fitting of the terminal 6a, and thereby prevented from being chattered. Also, the push button mounting member 4 is attached by insertion to the knob main body 1 so that the push button 5 and the switch 6 can be assembled on the knob main body 1, thereby reducing the number of assembling processes.

The present invention constructed as explained above has the following characteristics and beneficial effects.

(1) The present invention provides a shift knob with a switch that has a knob main body formed by a skeleton and a skin member encapsulating over the skeleton, a switch provided on the knob main body, and a conductor wire received in the skeleton and connected at one end to a terminal of the switch. The shift knob structure is characterized by the skeleton having a switch mounting portion for mounting the switch and a first support groove formed in a bottom surface of the switch mounting portion to insert therein the conductor wire; the skeleton having a second support groove formed in a lateral side thereof to insert therein the conductor wire; and a hole being formed open between the second support groove and the first support groove to pass the conductor wire therethrough. This shift knob structure facilitates insertion of the conductor wire through the hole in the skeleton.

(2) The hole has a relation of L1<D<L2, where L1 is a diameter of an opening of the hole on the side of the second support groove, an L2 is a diameter of an opening on the other end of the press-fit hole, and D is a diameter of the conductor wire. Therefore, the conductor wire can be held by hole.

(3) A grip portion of the skeleton has a second support groove formed generally perpendicular to the first support groove, and a third support groove provided generally perpendicular to the second support groove in a manner continuous therewith, wherein a slant surface is formed in the third support groove. Therefore, the number of points of bend working is decreased to reduce the cost and the number of assembling processes. The conductor wire can be easily press-fitted in and held by the third support groove.

(4) The third support groove has a relation of L3>D>L4, where L3 is a width of the opening of the third support groove, L4 is a width of a bottom surface of the third support groove, and D is the diameter of the conductor wire. Therefore, the conductor wire can be press-fitted in and held by the third support groove.

(5) The conductor wire is bent generally perpendicular at respective ends of a portion press-fitted in the second support groove, and comprises at a portion press-fitted in the third support groove a conductive metal wire elastically deformed to be buried in the skeleton. Therefore, the number of points of bend working can be reduced to reduce the cost and the number of assembling processes.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A shift knob structure that has a knob main body (1) formed by a skeleton (2) and a skin member (3) encapsulating over said skeleton (2), a switch (6) provided on said knob main body (1), and a conductor wire (7) received in said skeleton (2) and connected at one end to a terminal (6a) of said switch (6), the shift knob structure comprising:

a switch mounting portion (2f) formed in said skeleton (2) for mounting said switch (6), and a first support groove (2j) formed in a bottom surface of said switch mounting portion (2f) to insert therein the conductor wire (7);

a second support groove (2n) formed in a lateral side of said skeleton (2) to insert therein the conductor wire (7); and a press-fit through hole (2k) extending through a portion of said skeleton between said second support groove (2n) and said first support groove (2j), said press-fit through hole having a first diameter (L1) and a second diameter (L2) coupled by a passageway having a diameter sized to permit said conductor wire (7) to pass through and become press-fit into said press-fit through hole (2k).

2. The shift knob structure according to claim 1, wherein a relation of L1≦D<L2 exists, wherein L1 is a diameter of an end of the press-fit hole (2k) on the side of the first support groove (2j), L2 is a diameter of an end of the press-fit hole (2k) on the side of the second support groove (2n), and D is a diameter of the conductor wire (7).

3. The shift knob structure according to claim 2, wherein a grip portion (2a) of said skeleton (2) has said second support groove (2n) formed generally perpendicular to said first support groove (2j), and a third support groove (2p) provided generally perpendicular to said second support groove (2n) in a manner continuous therewith, wherein a slant surface (2r) is formed in said third support groove (2p).

4. The shift knob structure according to claim 3, wherein a relation of L3>D>L4 exists, wherein L3 is a width of an opening of the third support groove (2p), L4 is a width of a bottom surface of the third support groove (2p), and D is the diameter of said conductor wire (7).

5. The shift knob structure according to claim 4, wherein the conductor wire (7) is bent generally at right angles at respective ends of a portion of said conductor wire press-fitted in said second support groove (2n), and further comprising at a portion of said conductor wire press-fitted in said third support groove (2p) a conductive metal wire elastically deformed to be received in said skeleton (2).

6. The shift knob structure according to claim 1, wherein a grip portion (2a) of said skeleton (2) has said second support groove (2n) formed generally perpendicular to said first support groove (2j), and a third support groove (2p) provided generally perpendicular to said second support groove (2n) in a manner continuous therewith, wherein a slant surface (2r) is formed in said third support groove (2p).

7. The shift knob structure according to claim 6, wherein a relation of L3>D>L4 exists, wherein L3 is a width of an opening of the third support groove (2p), L4 is a width of a bottom surface of the third support groove (2p), and D is the diameter of said conductor wire (7).

8. The shift knob structure according to claim 7, wherein the conductor wire (7) is bent generally at right angles at respective ends of a portion of said conductor wire press-fitted in said second support groove (2n), and further comprising at a portion of said conductor wire press-fitted in said third support groove (2p) a conductive metal wire elastically deformed to be received in said skeleton (2).

* * * * *

UNITED STATES PATENT AND TRADEMARK OFFICE
CERTIFICATE OF CORRECTION

PATENT NO. : 6,023,032
DATED : February 8, 2000
INVENTOR(S) : Sato et al.

It is certified that error appears in the above-identified patent and that said Letters Patent is hereby corrected as shown below:

<u>Title page,</u>
Should read as follows: [54] SHIFT KNOB STRUCTURE WITH SUPPORT GROOVES AND HOLE FOR TIGHTLY RECEIVING CONDUCTOR WIRE.

Signed and Sealed this

Eighteenth Day of September, 2001

*Attest:*

NICHOLAS P. GODICI
*Attesting Officer*    *Acting Director of the United States Patent and Trademark Office*